(12) United States Patent
Singh et al.

(10) Patent No.: US 10,922,575 B1
(45) Date of Patent: Feb. 16, 2021

(54) GLYPH-AWARE UNDERLINING OF TEXT IN DIGITAL TYPOGRAPHY

(71) Applicant: Adobe Inc., San Jose, CA (US)

(72) Inventors: Pawan Kishor Singh, Uttar Pradesh (IN); Nirmal Kumawat, Rajsamand (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/556,440

(22) Filed: Aug. 30, 2019

(51) Int. Cl.
*G06K 9/34* (2006.01)
*G06T 11/20* (2006.01)
*G06F 40/109* (2020.01)

(52) U.S. Cl.
CPC ........... *G06K 9/346* (2013.01); *G06F 40/109* (2020.01); *G06K 9/344* (2013.01); *G06T 11/203* (2013.01)

(58) Field of Classification Search
CPC ...... G06K 9/346; G06K 9/344; G06F 40/109; G06T 11/203
See application file for complete search history.

(56) References Cited

U.S. PATENT DOCUMENTS

2005/0190187 A1* 9/2005 Salesin ................. G06T 11/203
345/471

OTHER PUBLICATIONS

"CSS Text Decoration Module Level 3", W3C Candidate Recommendation, Aug. 13, 2019 (Year: 2019).*

* cited by examiner

*Primary Examiner* — William A Beutel
(74) *Attorney, Agent, or Firm* — Finch & Maloney PLLC

(57) ABSTRACT

A glyph-aware method for underlining text in digital typography includes identifying first and second intersection coordinates where first and second bounds of an underline region of the text intersect with an outline path of a glyph in the text. Where such intersections occur, a portion of the outline path of the glyph between the first and second intersection coordinates is copied. First and second offset coordinates for the underline are determined by adding or subtracting an offset to the first and second intersection coordinates. A first underline outline path is constructed in the underline region, where the first underline outline path includes the copied of the outline path of the glyph between the first and second intersection coordinates. A display device renders an underline, at least partially, along the first underline outline path between the first and second offset coordinates in the underline region of the text.

20 Claims, 14 Drawing Sheets

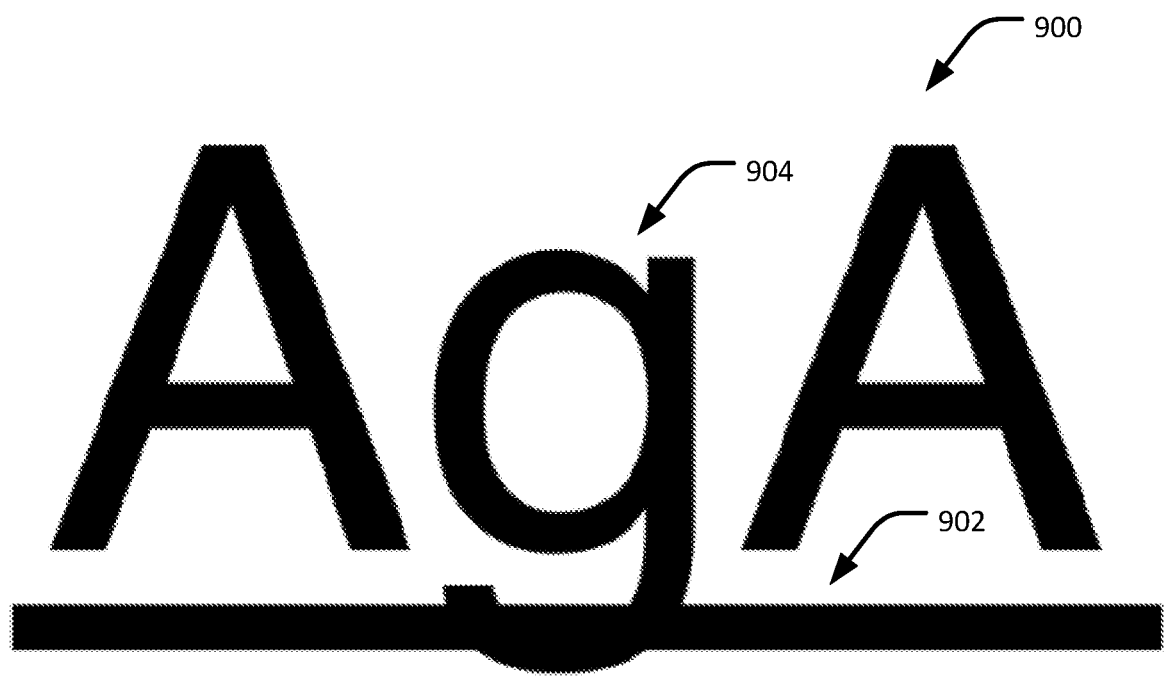
FIG. 10A
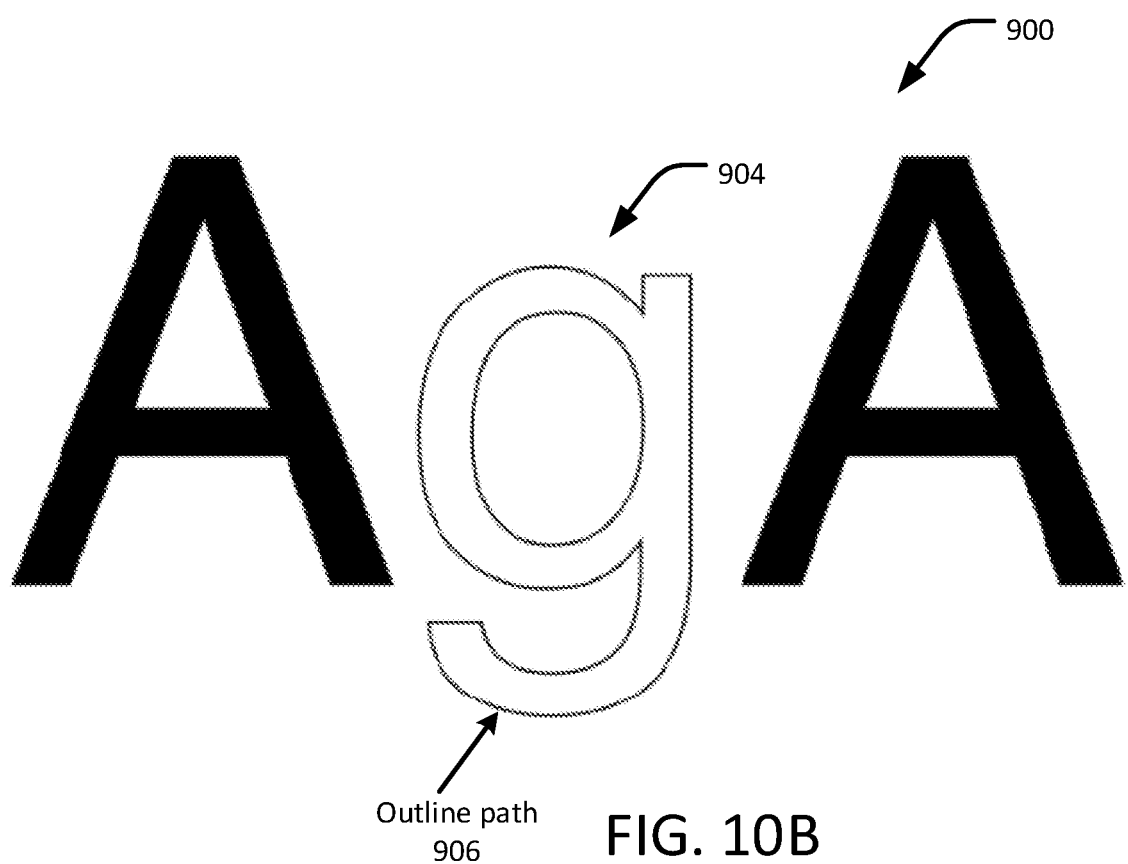
Outline path 906    FIG. 10B

My favorite pqyz

FIG. 13

HANGING

FIG. 14

GHOST

FIG. 15

(My Life is Awesome)

FIG. 16

GLYPH-AWARE UNDERLINING OF TEXT IN DIGITAL TYPOGRAPHY

FIELD OF THE DISCLOSURE

This disclosure relates to the field of digital typography, and more particularly, to techniques for glyph-aware underlining of text in digital typography.

BACKGROUND

In typography, an underline or an underscore is a horizontal line below or through a portion of text. FIG. 1 shows an example of underlined text 102. Single and double (double-underscore) underlining is often used to emphasize text. In some instances, an underline is used to denote misspelled or otherwise incorrect text. In printed documents, italics or small caps can be used for emphasis instead of underlining. In such instances, various forms of underlining are used to markup drafts prior to final typesetting to indicate that the text should be set in special type, such as italics. In some other instances, underlines are used as a diacritic to indicate that a letter has a different pronunciation from its non-underlined form. In certain web browsers, default settings typically distinguish hyperlinks by underlining them and changing their color, but both users and websites can change the settings to make some or all hyperlinks appear differently or even without distinction from normal text. Given the various purposes of underlining, there are non-trivial problems associated with rendering, displaying and printing underlined text in digital typography.

BRIEF DESCRIPTION OF THE DRAWINGS

The accompanying drawings are not intended to be drawn to scale.

FIGS. 10A, 10B, and 10C show the text of FIG. 9 where the underline overlaps with a glyph, in accordance with certain embodiments of the present disclosure.

FIGS. 13, 14, 15, and 16 show various examples of underlined text in accordance with certain embodiments of the present disclosure.

DETAILED DESCRIPTION

Figure 6:
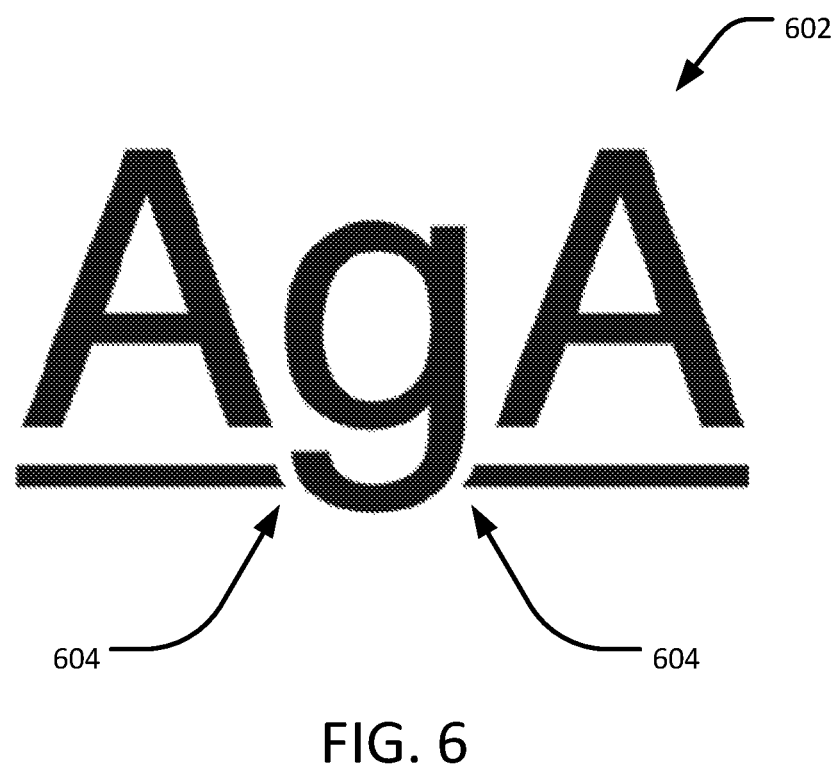
FIG. 6 is an example of underlined text where the underline is segmented using a glyph-aware underlining technique, in accordance with certain embodiments of the present disclosure.
Figure 8A:
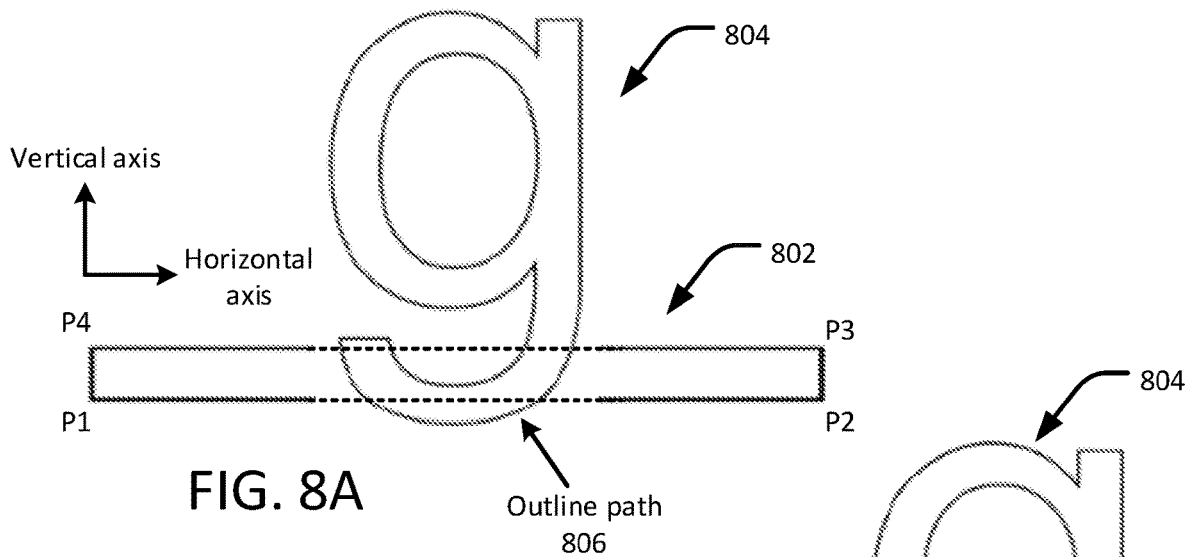
FIG. 8A shows an example underline region in a coordinate reference system, in accordance with certain embodiments of the present disclosure.
Figure 8B:
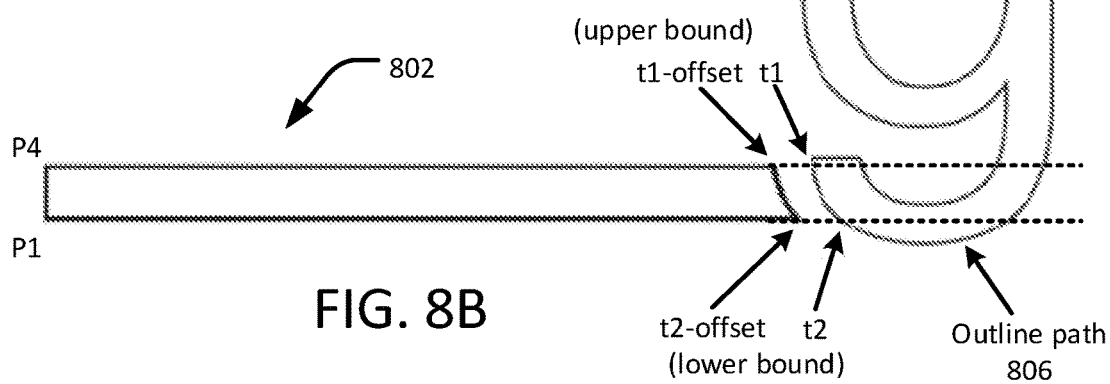
FIG. 8B shows a portion of the underline region of FIG. 8A where it intersects with a glyph, in accordance with certain embodiments of the present disclosure.
Figure 8C:
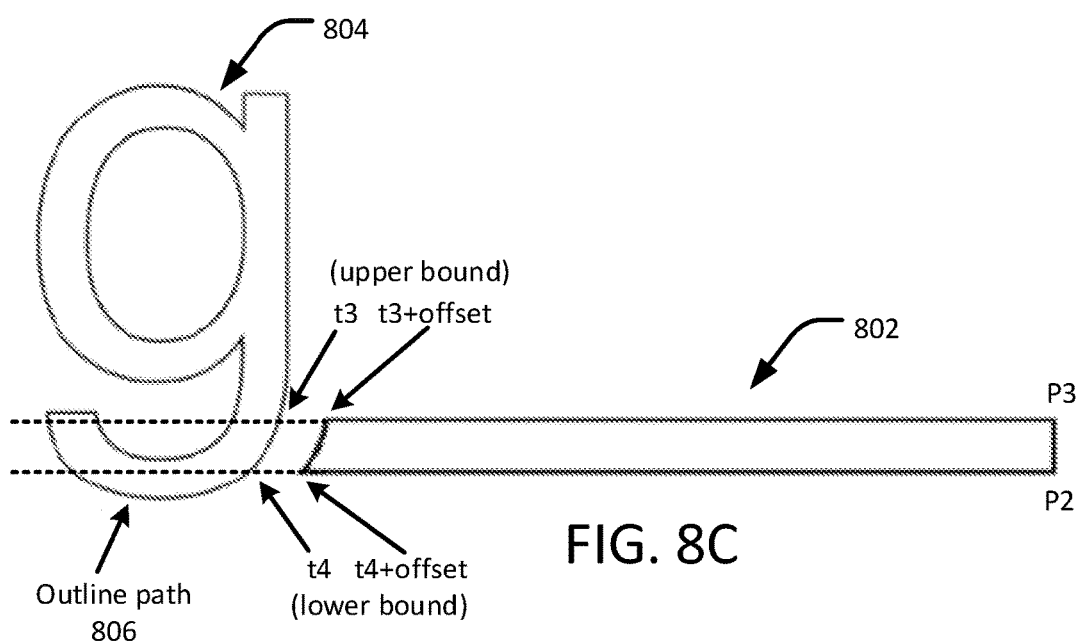
FIG. 8C shows another portion of the underline region of FIG. 8A where it intersects with a glyph, in accordance with certain embodiments of the present disclosure.
Figure 9:
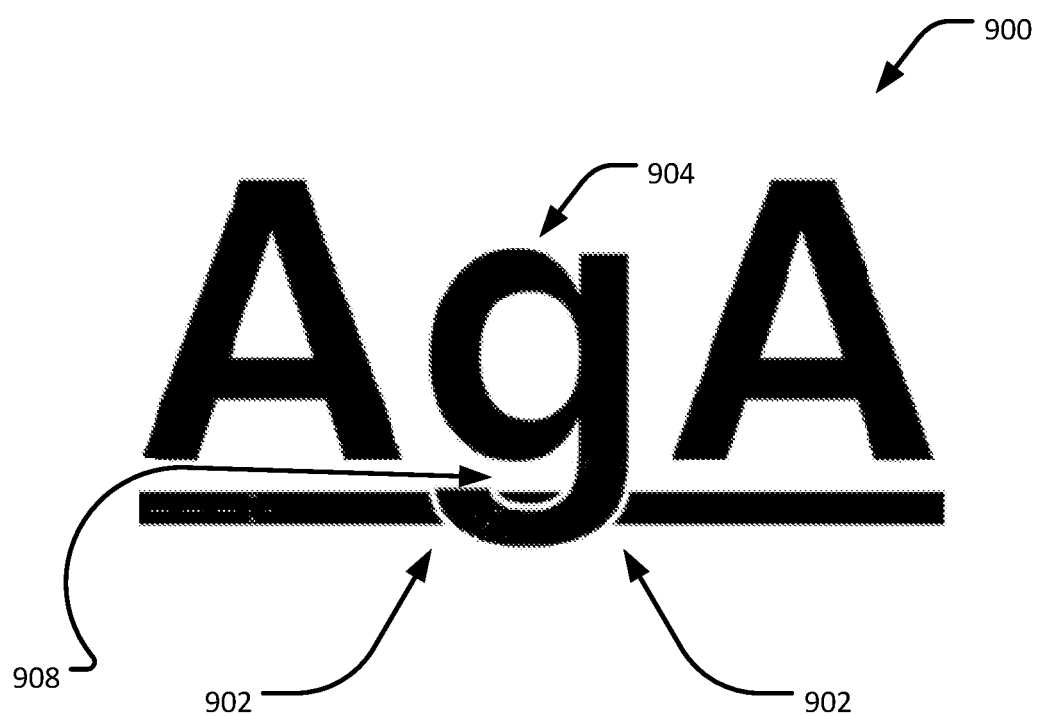
FIG. 9 is another example of underlined text where the underline is segmented using a glyph-aware underlining technique, in accordance with certain embodiments of the present disclosure.

In accordance with embodiments of the present disclosure, a glyph-aware method for underlining text in digital typography includes identifying first and second intersection coordinates where first and second bounds of an underline region of the text intersect with an outline path of a glyph in the text. The underline region includes an area where an underline is rendered on a display device, such as (but not limited to) the area immediately beneath the text, such as shown in FIGS. 8A-C. The outline path of the glyph describes, for example, the visible shape of the glyph when it is rendered or a variation of the shape that includes an offset from the edge of the glyph, such as shown in FIG. 10B. For example, the underline region may intersect the descender of one or more glyphs in the text. Where such intersections occur, a portion of the outline path of the glyph (the shape of the glyph) between the first and second intersection coordinates is copied. First and second offset coordinates for the underline are determined by adding or subtracting an offset to the first and second intersection coordinates. The offset provides visual spacing between the underline and the glyph. A first underline outline path is constructed in the underline region, where the first underline outline path includes the copied portion (that is, the shape) of the outline path of the glyph between the first and second intersection coordinates. A display device can render an underline, at least partially, along the first underline outline path between the first and second offset coordinates in the underline region of the text. In this manner, the shape of the underline conforms to the shape of the glyph, providing a visually appealing result, such as shown in FIGS. 6 and 9.

Figure 2:
FIG. 2 shows another example of underlined text where the underline intersects and cuts through the descenders of various glyphs.

Embodiments of the present disclosure address several problems relating to underlining text in digital typography. Some disclosed techniques for underlining text have a plain and simple appearance. However, the effect of underlining on rendered text using these techniques is not always visually pleasing. For example, in typography, a descender is a portion of a letter (glyph) that extends below the baseline of a font. If the underline intersects the descender, then the underline may cut through that portion of the glyph, which can produce an unpleasant visual effect. FIG. 2 shows an example of underlined text 202 where the underline intersects and cuts through the descenders of glyphs "p," "q," and "y." The overall combination of the text and underline in this example appears as if these typographic design components are being forcefully and inelegantly imposed upon each other. In this respect, the underline typeset is not aware of the shape of the glyph or the presence of the descender, causing the underline to overlap with the glyph. The underline thus appears alienated to the letter font and produces a clashing, non-synergistic effect.

Figure 3:
FIG. 3 shows yet another example of underlined text where glyphs with descenders are not underlined.

To avoid overlapping, some disclosed techniques break the underline into parts by eliminating portions of the underline under glyphs with descenders, such as shown in FIG. 3. In the underlined text 302 in FIG. 3, glyphs with descenders are not underlined while other glyphs are underlined normally. However, such solutions are not necessarily visually pleasing due to the abrupt and uneven breaks in the underline. Yet another disclosed technique includes manually erasing portions of the underline that intersect with the glyph. However, this manual technique can be tedious and time-consuming, depending on the shape of the glyphs and the overall design of the document. Thus, there remain non-trivial problems associated with underlining text in digital typography.

To this end, embodiments of the present disclosure, as described in further detail below, are considered glyph-aware because the underline corresponds with the shape of the glyph to provide a visually pleasing result. These novel techniques improve the visual and aesthetic appearance with an impactful solution that modifies an underline to visually correspond with the design of the glyph. For example, the underline can be modified to flow with the curves of the glyphs in a harmonious fashion so that the appearance of the underline is similar to the design and style of the glyph, rather than simply overlapping the underline with the glyph or creating harsh breaks in the underline to avoid intersecting with the glyph.

As used in this disclosure, the term "glyph" refers to a symbol used in the visual representation of a single character (e.g., "f") or several adjacent characters (e.g., "fi"). Each glyph has a width and height that may include a fixed amount of white space on one or more sides of the symbol. The width and height of the glyph can be measured in pixels or other suitable units. In some alphabets, a character may have multiple glyphs (e.g., upper and lowercase versions of the same character, or where the characters are represented by several different typographical fonts). Used in combination, glyphs can be used to spell words or give meaning to what is written (e.g., accent marks, punctuation marks, and the like). Generally, text is formed from a sequence of glyphs. As used in this disclosure, the term "underline" refers to any marking that is used in conjunction with one or more glyphs, including underlines, strikethroughs, underscores, overscores, or other marks adjacent to or intersecting with the glyphs.

System Architecture

Figure 4:
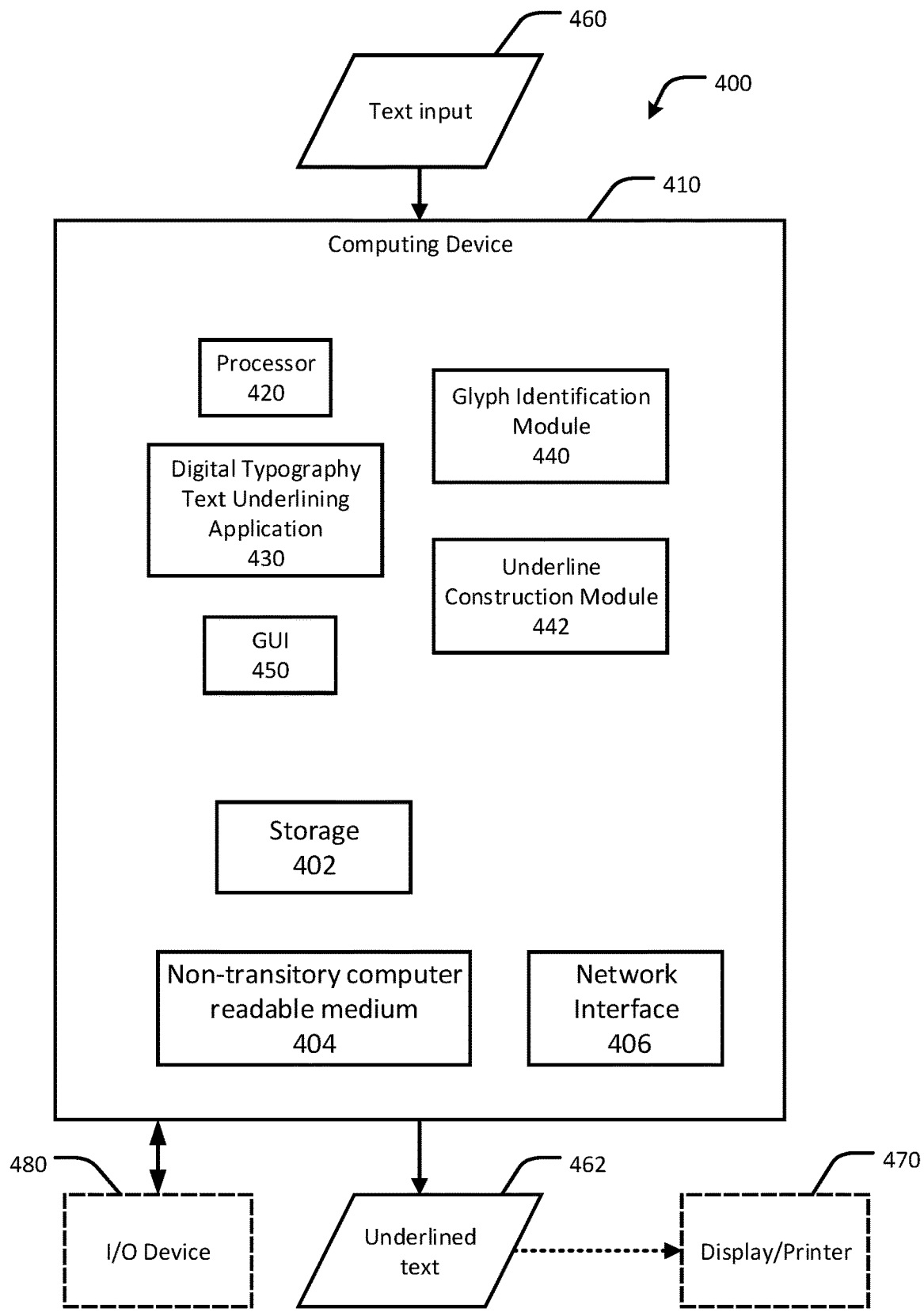
FIG. 4 shows an example system for underlining text in digital typography, in accordance with certain embodiments of the present disclosure.

FIG. 4 shows an example system 400 for underlining text in digital typography, in accordance with an embodiment of the present disclosure. The system 400 includes a computing device 410 having a processor 420, a Digital Typography Text Underlining Application 430, and a graphical user interface (GUI) 450. The GUI 450 includes a display and input device. The processor 420 of the computing device 410 is configured to execute Glyph Identification Module 440 and an Underline Construction Module 442, which are described in further detail below. The computing device 410 is further configured to receive, as an input, a text input 460. For example, the text input 460 could be input by a user by way of an I/O device 480, may be retrieved from storage 402, and/or may be received from a remote computing device via network interface 406. The text input 460 includes one or more glyphs to be rendered by a display or printer device 470. The computing device 410 is further configured to produce, as an output, underlined text 462 that is based at least in part on text input 460. The underlined text 462 is based on coordinates of intersections between an underline region and one or more glyphs in the text and/or outline paths of the glyphs, such as variously described in this disclosure.

As described in further detail below with respect to, for example, FIGS. 6-17, the Digital Typography Text Underlining Application 430 is configured to perform one or more of the following functions: identifying glyphs that intersect with an underline region associated with the text input 460, obtaining an outline of a glyph in the text input 460, obtaining an offset path of the glyph's outline, identifying intersections between the offset path of the glyph's outline and an underline region, copying (clipping) at least a portion of the glyph outline, constructing an underline as one or more closed paths, taking the intersections and copied glyph outlines into account, and producing the underlined text 462.

Figure 1:
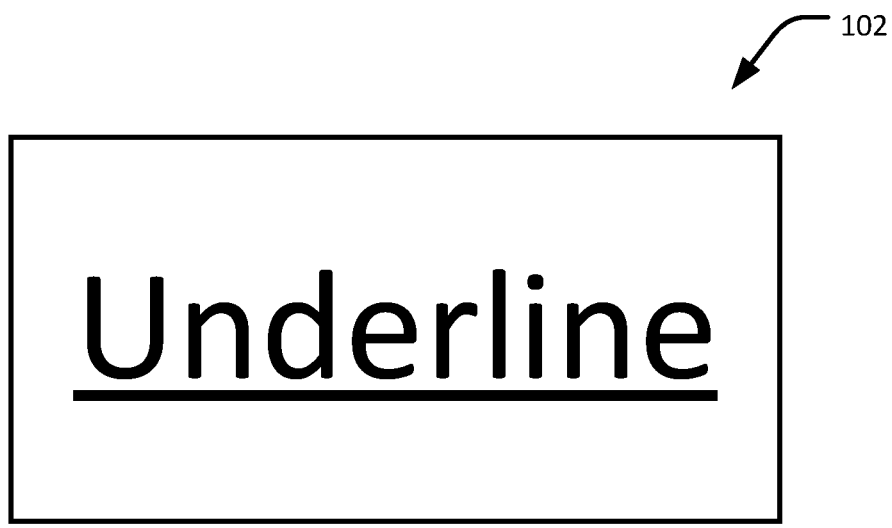
FIG. 1 shows an example of underlined text.

The computing device 410 can be used to perform any of the techniques as variously described in this disclosure. For example, the system 400 of FIG. 1, or any portions thereof, and the methodologies of FIGS. 7, 11 and 17, or any portions thereof, may be implemented in the computing device 410. The computing device 410 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 410 includes one or more storage devices 402 or non-transitory computer-readable media 404 having encoded thereon one or more computer-executable instructions or software for implementing techniques as variously described in this disclosure. The storage devices 402 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 402 may include other types of memory as well, or combinations thereof. The storage device 402 may be provided on the computing device 410 or provided separately or remotely from the computing device 410. The non-transitory computer-readable media 404 may include, but are not limited to, one or more types of hardware memory, non-transitory tangible media (for example, one or more magnetic storage disks, one or more optical disks, one or more USB flash drives), and the like. The non-transitory computer-readable media 404 included in the computing device 410 may store computer-readable and computer-executable instructions or software for implementing various embodiments. The computer-readable media 404 may be provided on the computing device 410 or provided separately or remotely from the computing device 410.

The computing device 410 also includes at least one processor 420 for executing computer-readable and computer-executable instructions or software stored in the storage device 402 or non-transitory computer-readable media 404 and other programs for controlling system hardware. Virtualization may be employed in the computing device 410 so that infrastructure and resources in the computing device 410 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 410 through an output device 470, such as a screen, monitor, display, or printer, including an augmented reality display device, which may display one or more user interfaces provided in accordance with some embodiments. The output device 470 may also display other aspects, elements or information or data associated with some embodiments. The computing device 410 may include other I/O devices 480 for receiving input from a user, for example, a keyboard, a joystick, a game controller, a pointing device (e.g., a mouse, a user's finger interfacing directly with a touch-sensitive display device, etc.), microphone, or any suitable user interface. The computing device 410 may include other suitable conventional I/O peripherals. The computing device 410 includes or is operatively coupled to various suitable devices for performing one or more of the aspects as variously described in this disclosure.

The computing device 410 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 410 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the Digital Typography Text Underlining Application 430, the Glyph Identification Module 440, the Underline Construction Module 442, the GUI 450, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 410, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Example Methods

Figure 5:
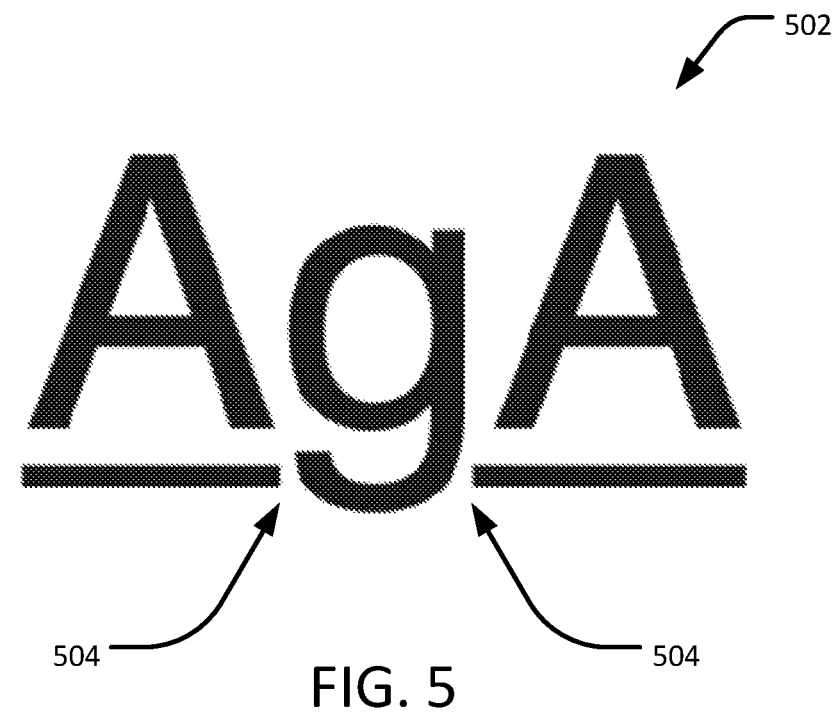
FIG. 5 is an example of underlined text where the underline is segmented, in accordance with certain embodiments of the present disclosure.

FIG. 5 is an example of underlined text 502 where the underline is segmented as indicated at 504 to avoid overlapping with the descender of the glyph "g." As can be seen in this example, the segments 504 of the underline are divided into two rectangles at the point where the underline intersects the glyph. An offset (or padding) from the glyph is added to each segment 504 to provide visual spacing between the underline and the glyph. Note that the segments 504 have vertical edges that do not conform to the shape of the glyph at the intersections between the underline and the glyph.

FIG. 6 is an example of underlined text 602 where the underline is segmented as indicated at 604 to avoid overlapping with the descender of the glyph "g," in accordance with an embodiment of the present disclosure. As can be seen in this example, the segments 604 of the underline are divided into two semi-rectangles at the point where the underline intersects the glyph. An offset (or padding) from the glyph is added to each segment 604 to provide visual spacing between the underline and the glyph. Note that, in contrast to the segments 504 of FIG. 5, which are rectangular, the segments 604 have curved edges at one end that conform to the shape of the glyph at the intersections between the underline and the glyph. The result is a more visually appealing typography than as shown in FIG. 5.

Figure 7:
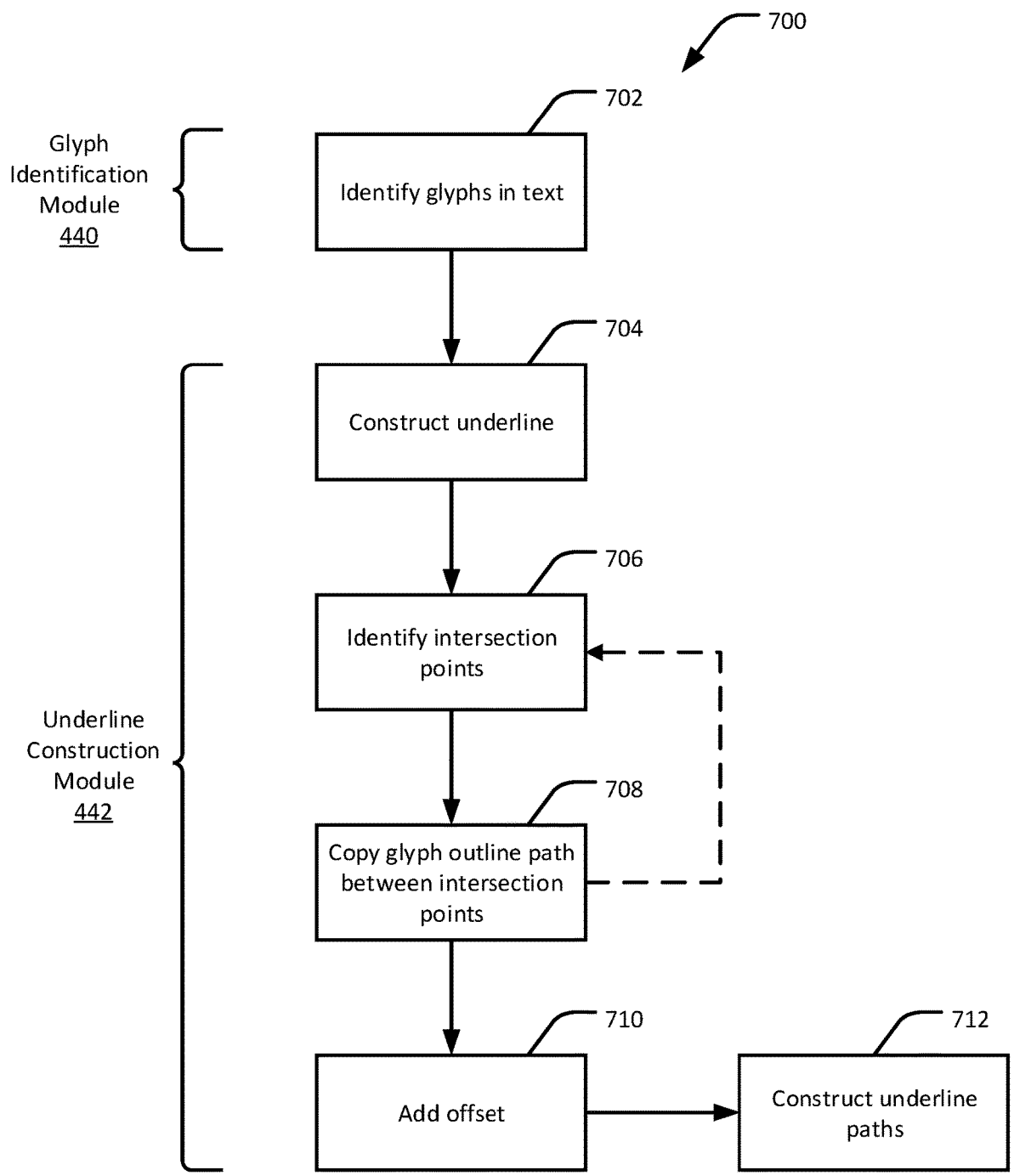
FIG. 7 is a flow diagram of an example method for glyph-aware underlining of text in digital typography, in accordance with certain embodiments of the present disclosure.

FIG. 7 is a flow diagram of an example method 700 for glyph-aware underlining of text in digital typography, in accordance with an embodiment of the present disclosure. The method 700 can be useful, for example, in scenarios where a relatively unadorned underline is desired, such as shown in FIG. 6. The method 700 can be implemented, for example, by the Digital Typography Text Underlining Application 430, the Glyph Identification Module 440, and the Underline Construction Module 442 of FIG. 4. The method 700 includes identifying 702 one or more glyphs in a series of glyphs forming a text. For example, referring to FIG. 6, the text 602 includes the glyphs "AgA."

The method 700 further includes constructing 704 an underline as one or more closed paths by considering each intersection between an underline region containing the underline and portions of the glyphs or regions offset from the edges of the glyphs.

FIG. 8A shows an example underline region 802 defined by points P1, P2, P3, and P4 in a coordinate reference system having a horizontal axis and a vertical axis. A glyph 804 has a descender that intersects with the underline region 802 as indicated by the dashed lines.

FIG. 8B shows a portion of the underline region 802 where it intersects with the glyph 804 at points t1 and t2. In this example, the upper bound of the underline region 802 intersects the glyph 804 at point t1 and the lower bound of the underline region 802 intersects the glyph 804 at point t2.

The intersection can be defined, for example, as a set of (x, y) (horizontal, vertical) coordinates or other suitable coordinates relative to a reference point (such as a text block or page) in the digital typography. In some cases, the glyph is represented by an outline path 806 (such as for outline fonts) represented as one or more closed Bezier paths. Thus, any line passing through a fixed y-coordinate will always intersect the glyph outline path at a multiple of two coordinates or locations (for example, at the upper bounds of the underline region 802 as indicated by the upper dashed line).

In accordance with an embodiment, the underline region is constructed 704 as a closed path based on the outermost outline path of the glyph intersecting with the underline region, such as shown in FIG. 6, rather than as a simple rectangular shape, as shown in FIG. 5. The underline region bounds, including upper and lower y-coordinates, intersect at the left and right bounds of the glyph outline path 806. In some cases, the inner path of the glyph outline, if any, can be ignored. For example, the outline of the character "g" may intersect with the underline region between the left and right descenders of the "g" (the inner portion of the glyph through which the underline region passes). However, in some embodiments, it is not necessary to construct an underline through the inner portion of the glyph.

Referring again to FIG. 7, the method 700 further includes identifying 706 intersection points at the upper and lower bounds of the underline region and the outermost outline path of the glyph. For example, when moving in one direction (such as from left to right or from bottom to top), the first two intersection points of the underline region and the glyph outline path are located at points t1 and t2 on the left side of the glyph, as shown in FIG. 8B. Next, the outline path 806 of the glyph 804 between points t1 and t2 is copied 708 and stored in a memory or storage device. The outline path 806 of the glyph defines the shape of the glyph 804 as rendered on a display device and can, in some instances, include an offset (visual spacing) from the rendered shape (as indicated in FIG. 8B as t1-offset and t2-offset).

Referring again to FIG. 7, an offset (padding or spacing) is added 710 to the x-coordinates of copied path t1-t2, which maintains a gap between the glyph 804 and the underline region 802. FIG. 8B shows offset coordinates t1-offset and t2-offset at the upper and lower bounds, respectively, of the underline region 802. Next, the underline is constructed 712 as a closed path based on the copied path between t1 and t2, offset along the x-axis from the outer path of the glyph. For example, as shown in FIG. 8B, the underline includes a path P1-(t2-offset)-(t1-offset)-P4, which is within the underline region 802.

FIG. 8C shows another portion of the underline region 802 where it intersects with the glyph 804 at points t3 and t4. Like the intersection points t1 and t2 in the left side of glyph, an intersected path on glyph outline can be identified in right side of the glyph which acts as the start of the underline (again, moving left to right or bottom to top) and a modified underline closed path is constructed. In this example, the upper bound of the underline region 802 intersects the glyph 804 at point t3, and the lower bound of the underline region 802 intersects the glyph 804 at point t4. Similar to the process described with respect to FIG. 7, the outline is constructed 712 as a closed path based on the outline path 806 of the glyph 804 between t3 and t4, offset from the outer path of the glyph. For example, as shown in FIG. 8C, the underline includes a path P3-(t3+offset)-(t4+offset)-P2, which is within the underline region 802. Note that the offset polarity in this example is arbitrary and is a function of the glyph outline or offset glyph outline at the point where it intersects with the underline region.

FIG. 6 shows the underline region 802 after it is modified by the paths t1-t2 and t3-t4.

A pseudo-algorithm for digital typography underlining in accordance with an embodiment, such as described with respect to FIG. 7, is as follows. Inputs to the pseudo-algorithm include a text object T having one or more glyphs, an underline position uPos, an underline thickness uThick, and an offset Off. The offset is, for example, a distance between the outline (edge) of the glyph and the offset outline of the glyph either measured along the x (horizontal) or y (vertical) axis relative to the underline region or at another angle relative to the glyph outline (for example, perpendicular to the Bezier curve at the intersection point). An output of the pseudo-algorithm includes an underline as multiple closed paths uPaths.

1. Begin.
2. Set underline paths array as empty:
   uPaths.SetEmpty( );
3. Compute the upper uTop and lower bounds uBottom of underline based on underline position and underline thickness.
   uTop=uPos+uThick/2;
   uBottom=uPos-uThick/2;
4. For each glyph g in the text object T
   a. If outline of glyph g is intersected at both uTop and uBottom
      i. Locate intersection points on left side t1 and t2
         t1=intersection point through uTop
         t2=intersection point through uBottom
      ii. Copy the glyph outer path between t1 and t2 and save it in memory as clippedPath.
      iii. Adjust the offset Off by adding/subtracting it to x-coordinates of clippedPath points.
      iv. Construct the underline as new closed path uPath
         uPath.MoveTo(P1);
         uPath.LineTo(t2);
         uPath.AppendPath(clippedPath);
         uPath.LineTo(P4);
         uPath.Close( ).
      v. Add the uPath in output underline paths array uPaths
         uPaths.push_back(uPath);
      vi. Repeat the steps (4.a.i) to (4.a.v) for the intersection points on right side t3, t4 of glyph's outer path.
         t3=intersection point through uTop on right side of glyph
         t4=intersection point through uBottom on right side of glyph
   b. Else, get the next glyph g.
5. If underline paths array is empty (i.e., there are no intersections between the underline path and the glyph), then construct the underline as rectangle.
   uPath.MakeRect(uTop,uBottom,uLeft,uRight);
   uPaths.push_back(uPath);
6. Output underline paths array uPaths.
7. End.

In this way, multiple underline paths are constructed based on the glyph's outer intersection points by considering the glyph's shape which is considered a glyph-aware solution. The underline paths can then be rendered along with the text. Every time the text is entered or edited, underline paths are constructed according to the current text object, which is considered a glyph-aware underline with live text editing. Note that if only one bound of the underline region (either upper or lower) intersects the glyph outline path, then the position of the underline and/or the thickness of the underline is adjusted such that both the upper and lower bounds of the underline region intersect the glyph outline path.

FIG. 9 is another example of underlined text 900 where the underline is segmented as indicated at 902 to avoid overlapping with the descender of the glyph "g," in accordance with an embodiment of the present disclosure. As can be seen in this example, the segments 902 of the underline are divided into two semi-rectangles at the points where the underline intersects the glyph 904. An offset (or padding) from the glyph 904 is added to each segment 902 to provide visual spacing between the underline and the glyph. Additionally, the underline includes a portion within the descender of the glyph, indicated at 908, as a further adornment to the underlined text 900. Note that, in contrast to the segments 504 of FIG. 5, which are rectangular, the segments 902 and 908 each have curved edges at one end that conform to the shape of the glyph at the intersections between the underline and the glyph. The result is a more visually appealing typography than as shown in FIG. 5.

Figure 10C:
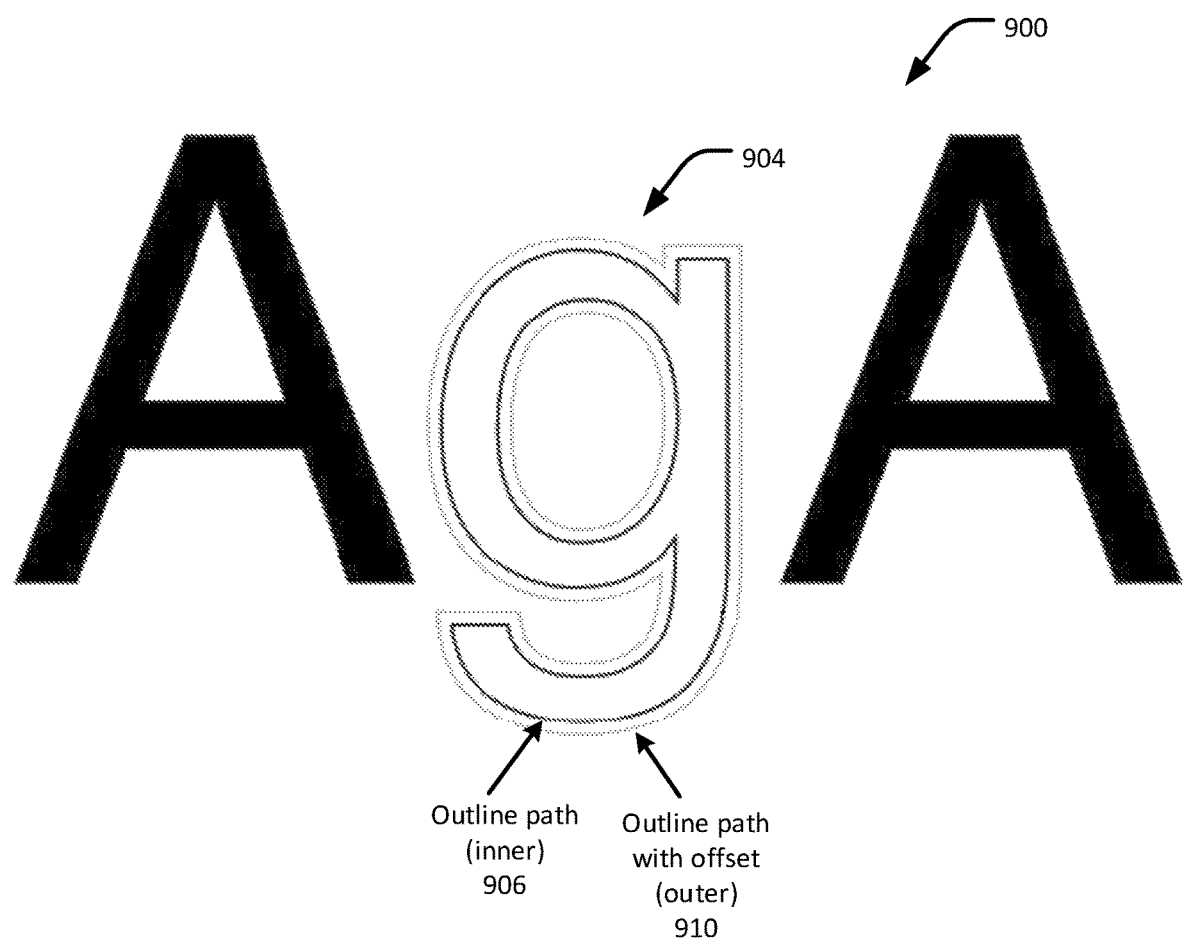

FIG. 10A shows the text 900 of FIG. 9 where the underline region 902 overlaps with the glyph 904. FIG. 10B shows an outline path 906 of the glyph 904. FIG. 10C shows the outline path 906 of the glyph 904 (inner) and the outline path 910 of the glyph 904 with an offset (outer).

Figure 11:
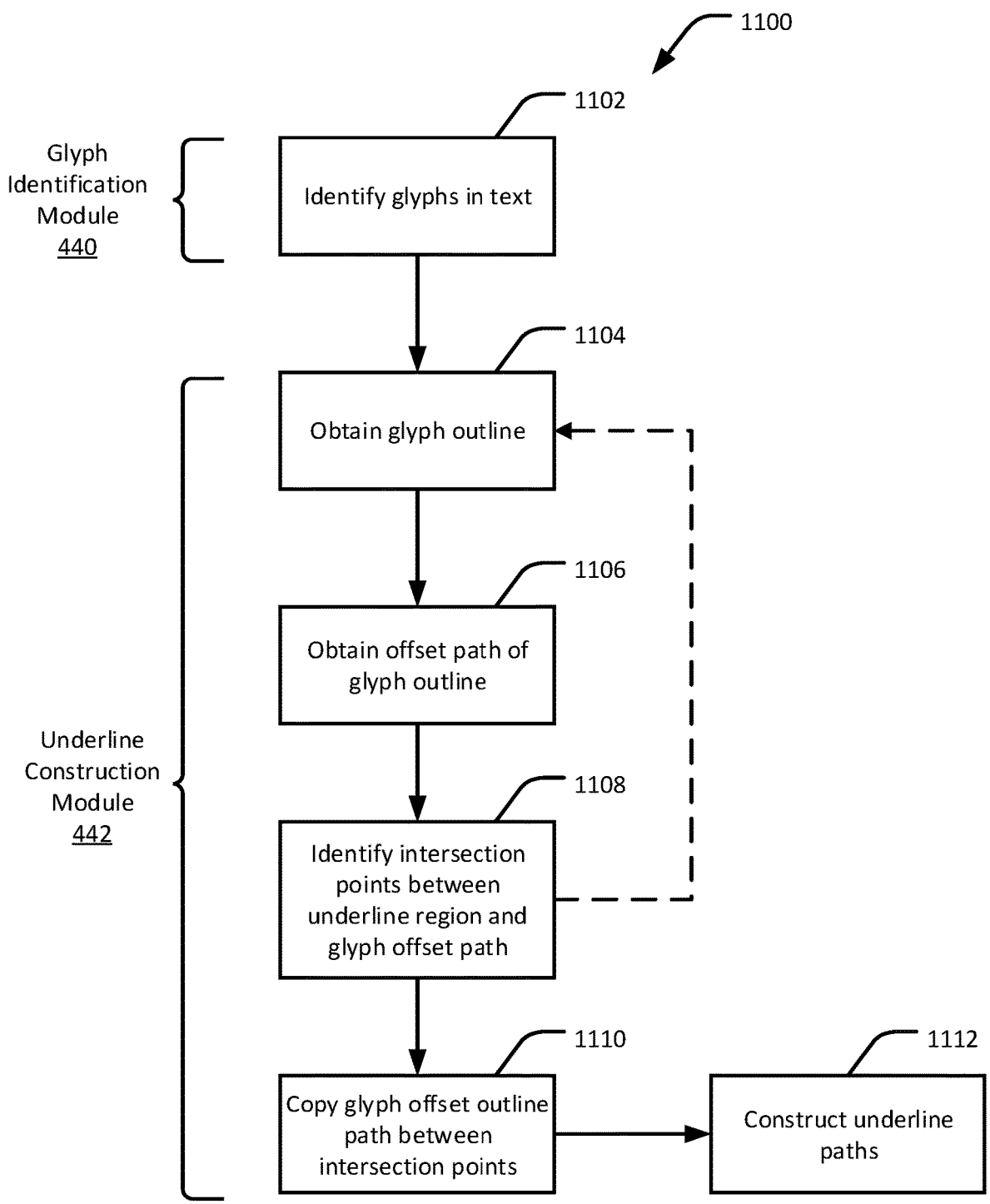
FIG. 11 is a flow diagram of an example method for glyph-aware underlining of text in digital typography, in accordance with certain embodiments of the present disclosure.

FIG. 11 is a flow diagram of an example method 1100 for glyph-aware underlining of text in digital typography, in accordance with an embodiment of the present disclosure. The method 1100 can be useful, for example, in scenarios where a relatively ornate underline is desired, such as shown in FIG. 9 where a portion of the underline is rendered within the descender of the glyph 904, as indicated at 908. The method 1100 can be implemented, for example, by the Digital Typography Text Underlining Application 430, the Glyph Identification Module 440, and the Underline Construction Module 442 of FIG. 4. The method 1100 includes identifying 1102 one or more glyphs in a series of glyphs forming a text. For example, referring to FIG. 9, the text 900 includes the glyphs "AgA."

The shape of the underline region 902 is constructed as a closed path rather than as a simple rectangular shape based on the outermost outline path of the glyph intersecting with the underline region. The underline region bounds, including upper and lower y-coordinates, intersect at the left and right bounds of the glyph outline path. In some cases, the inner path of the glyph outline, if any, can include a portion of the underline. For example, the outline of the character "g" may intersect with the underline region between the left and right descenders of the "g" (the inner portion of the glyph through which the underline region passes). Thus, in some embodiments, an underline is constructed through the inner portion of the glyph.

The method 1100 further includes obtaining 1104 an outline of the glyph as one or more closed paths, such as shown in FIG. 10C.

Figure 12A:
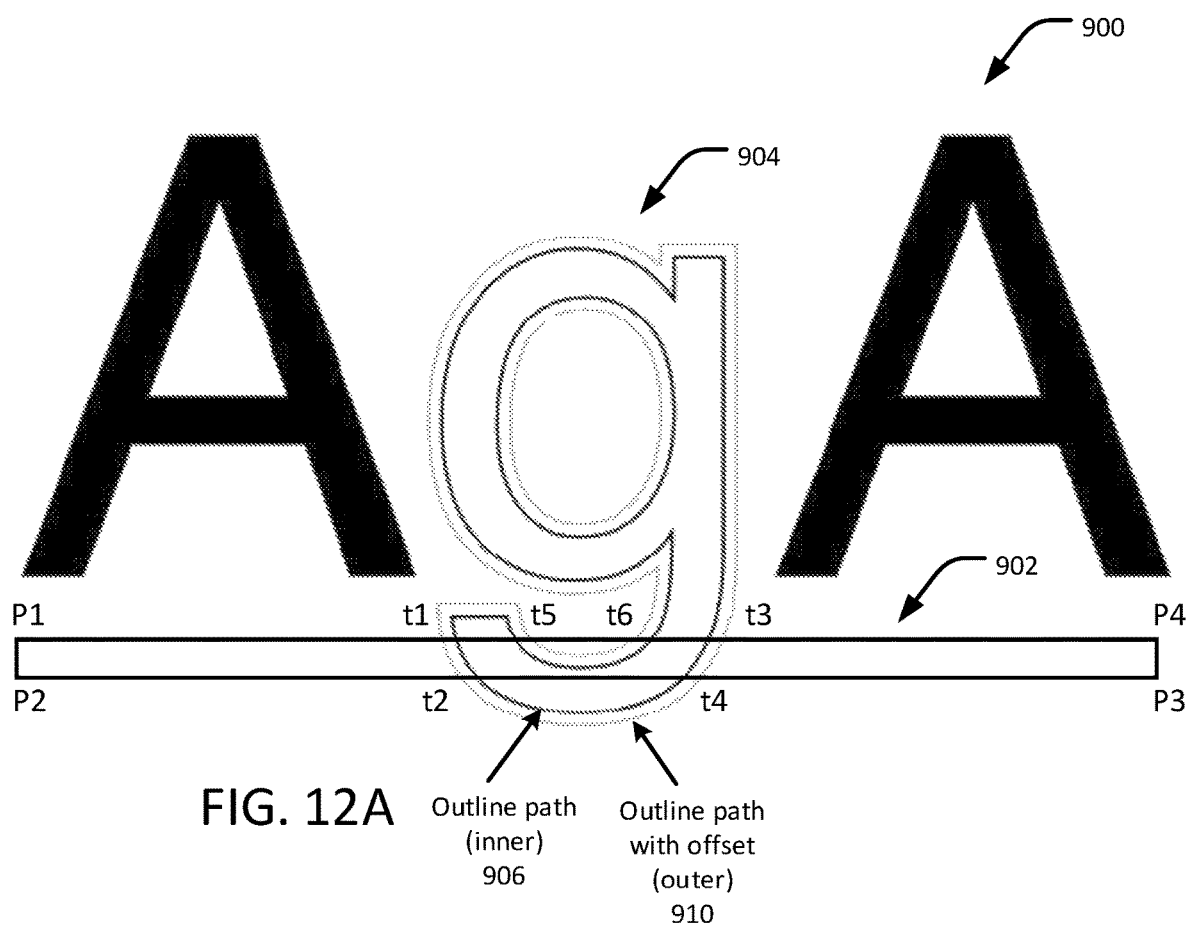
FIG. 12A shows a portion of the underline region of FIG. 9 where it intersects with a glyph, in accordance with certain embodiments of the present disclosure.

FIG. 12A shows an example underline region 902 defined by points P1, P2, P3, and P4 in a coordinate reference system having a horizontal axis and a vertical axis. A glyph 904 has a descender that intersects with the underline region 902.

FIG. 12A further shows a portion of the underline region 902 where it intersects with the glyph 904 at points t1, t2, t3, t4, t5, and t6. In this example, the upper bound of the underline region 902 intersects the glyph 904 at points t1, t5, t6, and t3, and the lower bound of the underline region 902 intersects the glyph 904 at points t2 and t4. Each intersection can be defined, for example, as a set of (x, y) coordinates or other suitable coordinates relative to a reference point (such as a text block or page) in the digital typography. In some cases, the glyph is represented by an outline (such as for outline fonts) represented as one or more closed Bezier paths. Thus, any line passing through a fixed y-coordinate will always intersect the glyph outline path at a multiple of two coordinates or locations (for example, at the upper bounds of the underline region 902).

Referring again to FIG. 11, the method 1100 further includes obtaining 1106 an offset path of the outline of the glyph. The offset path is determined by the offset (padding or spacing) between the glyph and the underline, such as the glyph offset outline path 910 shown in FIG. 12A. Note that the offset path can, in some embodiments, be user-specified.

The method 1100 further includes identifying 1108 all the intersection points between the underline region and the offset glyph outline path and both of the underline bounds on the offset path. As shown in FIG. 12A, points t1, t5, t6, t3 are intersection points through the upper bound of the underline region and points t2, t4 are intersected through the lower bound of the underline region.

Next, the offset outline path 910 of the glyph 904 (e.g., between points t1 and t2) is copied 1110 based on the intersection points and underline bounds and stored in a memory or storage device. The outline path 906 of the glyph defines the shape of the glyph 904 as rendered on a display device and can, in some instances, include the offset 910 (visual spacing) from the rendered shape. For example, as shown in FIG. 12A, there can be three different copied paths where clipPath1={t1, t2}, clipPath2={t5, t6} and clipPath3={t3, t4}.

Next, based on the copied paths and the underline bounds, three different underline paths are constructed 1112 as follows: P1-P2-t2-t1-P1; t5-t6-t5; and t3-t4-P3-P4-t3. The paths between t2 and t1, t5 and t6, and t3 and t4 are the copied paths taken from the glyph outline path, such as described above, such that the copied paths follow the curvature of the corresponding portion of the glyph where the underline region intersects the glyph.

underline Path1.MoveTo(P1);
    underline Path1.LineTo(P2);
    underline Path1.LineTo(t2);
    underline Path1.AppendPath(t2,t1);
    underline Path1.LineTo(P1); underline Path1.Close( );
    underline Path2.MoveTo(t5);
    underline Path2.LineTo(t6);
    underline Path2.AppendPath(t6,t5);
    underline Path2.Close( );
    underline Path3.MoveTo(t3);
    underline Path3.AppendPath(t3,t4);
    underlinePath3.LineTo(P3);
    underline Path3.LineTo(P4);
    underline Path3.LineTo(t3);
    underline Path3.Close( );

The above steps are derived using intersection of both bounds and taking care of inner path of outline. If there is only one bound is intersected on the offset-path, then the entire path between intersection points along with that bound is copied to construct the corresponding portion of the underline path. This permits multiple underline paths which are used to render on the user's screen along with the text.

A pseudo-algorithm for digital typography underlining in accordance with an embodiment is as follows. Inputs to the pseudo-algorithm includes a text object T having one or more glyphs, an underline position uPos, an underline thickness uThick, and an offset Off. The offset is, for example, a distance between the outline (edge) of the glyph and the offset outline of the glyph either measured along the x (horizontal) or y (vertical) axis relative to the underline region or at another angle relative to the glyph outline (for example, perpendicular to the Bezier curve at the intersection point). An output of the pseudo-algorithm includes an underline as multiple closed paths uPaths.
1. Begin.
2. Set underline paths array to empty.
    uPaths.SetEmpty( );
3. Compute the upper uTop and lower bounds uBottom of underline based on underline position and underline thickness.
    uTop=uPos+uThick/2; uBottom=uPos−uThick/2;
4. For each glyph g in the text object T
    a. If outline of glyph g is intersected at any of the bound uTop and uBottom
        i. Get the in-place offset-path of glyph's outline using Off value.
        ii. Get all the intersection points along with uTop and uBottom on offset-path.
            array1=array of intersection points through uTop
            array2=array of intersection points through uBottom
        iii. Based on array1 and array2, construct the underline-paths (such as described above).
        iv. Add the uPath in output underline paths array uPaths uPaths.push_back(uPath);
    b. Else, get the next glyph.
5. If underline paths array is empty, then construct the underline as a rectangle.
    uPath.MakeRect(uTop,uBottom,uLeft,uRight);
    uPaths.push_back(uPath);
6. Output underline paths array uPaths.
7. End.

The resultant underline paths can be rendered along with the text.

Figure 12B:
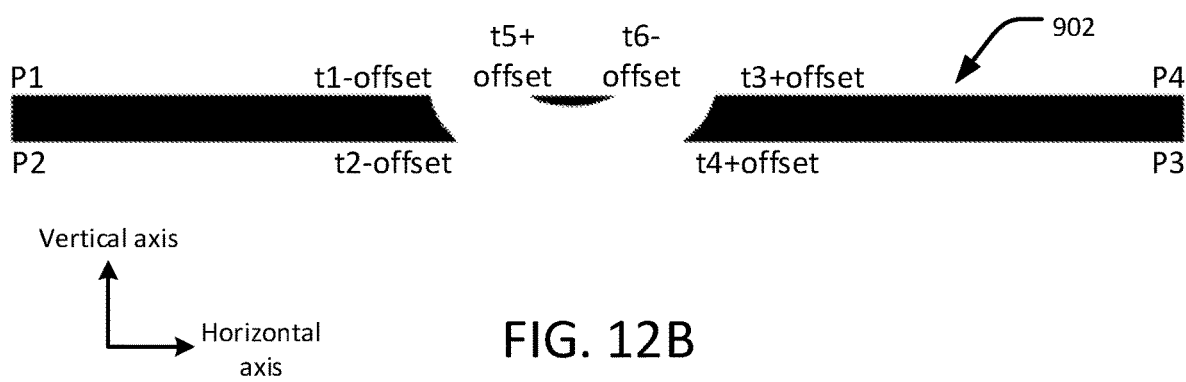
FIG. 12B shows resultant underline paths obtained using a glyph-aware underlining technique, in accordance with certain embodiments of the present disclosure.

FIG. 12B shows the resultant underline paths P1-P2-(t2-offset)-(t1-offset); (t4+offset)-(t6-offset); and (t3+offset)-P4-P3-(t4+offset). Note that the offset polarity in this example is arbitrary and is a function of the glyph outline or offset glyph outline at the point where it intersects with the underline region. FIG. 9 shows the underline region 902 after it is modified by the paths of FIG. 12B.

FIGS. 13, 14, 15, and 16 show various examples of underlined text in accordance with embodiments of the present disclosure. Note that in some instances the underline is not necessarily located below the text, such as shown in FIG. 14, or the underline is not a solid line, such as shown in FIG. 16. Note in FIG. 14 the underline does not appear within the apex of the glyph "A" due to the offset. In each of these examples, the underline has been modified to conform to the shape of the glyphs through which it passes, achieving a visually pleasing result.

Example Methodologies

Figure 17:
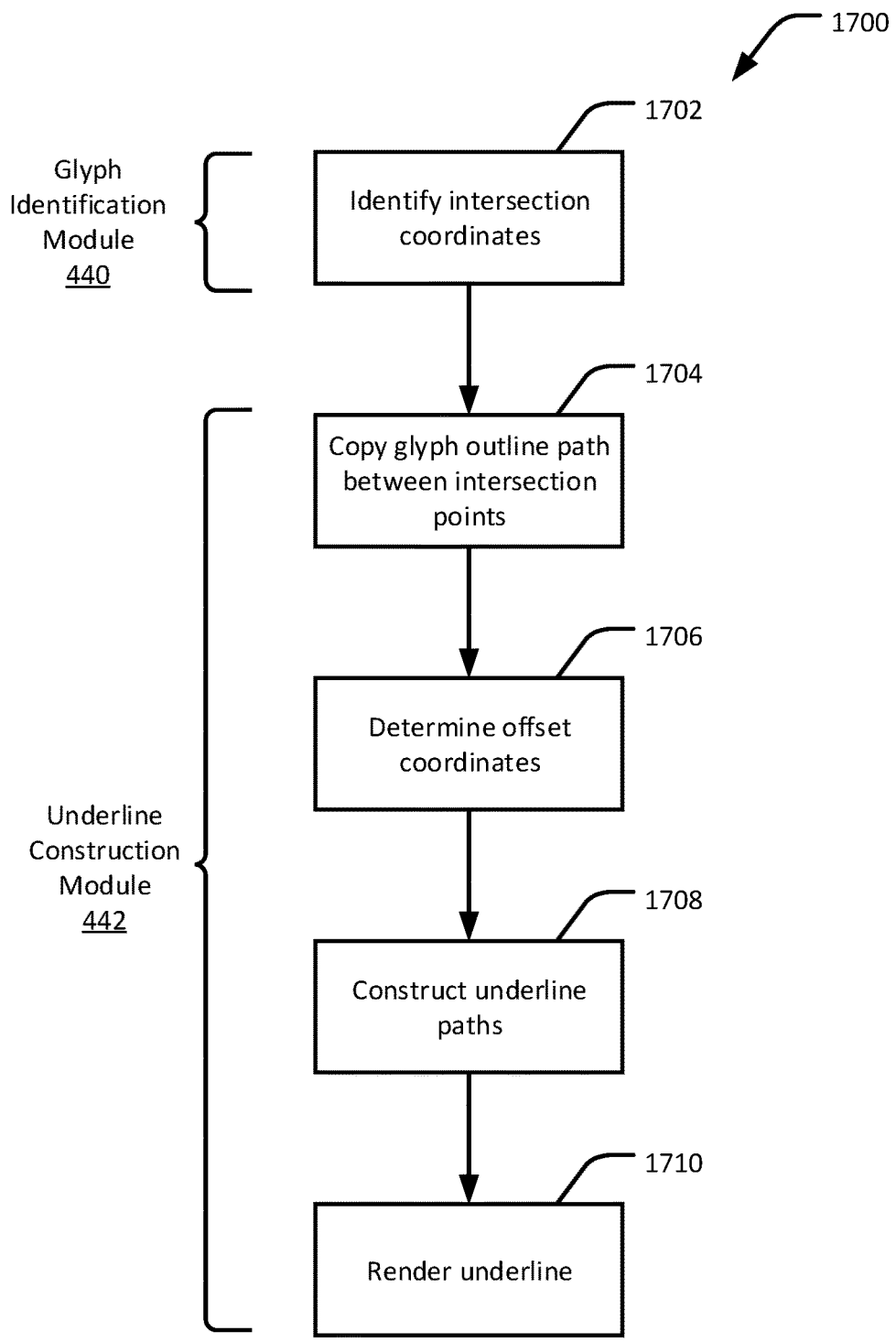
FIG. 17 is a flow diagram of an example method for underlining text in digital typography, in accordance with certain embodiments of the present disclosure.

FIG. 17 is a flow diagram of an example method 1700 for underlining text in digital typography, in accordance with an embodiment of the present disclosure. The method 1700 can be useful, for example, in scenarios where various amounts of adornment of the underline are desired, such as variously shown in FIGS. 6 and 9. The method 1700 includes identifying 1702 first and second intersection coordinates at two points where first and second bounds of an underline region of the text intersect with an outline path of a glyph in the text. For example, FIG. 8B shows a portion of the underline region 802 where it intersects with the glyph 804 at points t1 and t2. In this example, the upper bound of the underline region 802 intersects the glyph 804 at point t1, and the lower bound of the underline region 802 intersects the glyph 804 at point t2. The intersection can be defined, for example, as a set of (x, y) coordinates or other suitable coordinates relative to a reference point (such as a text block or page) in the digital typography.

The method 1700 further includes copying 1704 a portion of the outline path of the glyph between the first and second intersection coordinates (for example, between points t1 and t2 in FIG. 8B). The method 1700 further includes determining 1706 first and second offset coordinates by adding or subtracting an offset to the first and second intersection coordinates. For example, FIG. 8B shows offset coordinates t1-offset and t2-offset at the upper and lower bounds, respectively, of the underline region 802.

The method 1700 further includes constructing 1708 a first underline outline path in the underline region. The first underline outline path includes the copied portion of the outline path of the glyph between the first and second intersection coordinates. The method 1700 further includes causing 1710 a display device to render an underline along the first underline outline path between the first and second offset coordinates in the underline region of the text. For example, FIG. 6 shows the underline region 802 rendered after it is modified by the paths t1-t2 and t3-t4.

In some cases, the first bounds of the underline region is an upper bounds of the underline region, and the second bounds of the underline region is a lower bounds of the underline region, such as shown in FIGS. 8B and 8C. In some cases, the first and second bounds of the underline region are both an upper bounds of the underline region or a lower bounds of the underline region, such as shown in FIG. 12A (points t1, t5, t6, and t3 are intersections between the upper bounds of the underline region 902 and the glyph outline 906, and points t2 and t4 are intersections between the lower bounds of the underline region 902 and the glyph outline 906). Other variations will be apparent in view of this disclosure.

Numerous embodiments will be apparent in light of the present disclosure, and features described herein can be combined in any number of configurations. One example embodiment provides a computer-implemented method for underlining text in digital typography. The method includes identifying, by at least one processor, first and second intersection coordinates where first and second bounds of an underline region of the text intersect with an outline path of a glyph in the text. The method further includes copying, by the at least one processor, a portion of the outline path of the glyph between the first and second intersection coordinates. The method further includes determining, by the at least one processor, first and second offset coordinates by adding or subtracting an offset to the first and second intersection coordinates. The method further includes constructing, by the at least one processor, a first underline outline path in the underline region, the first underline outline path including the copied portion of the outline path of the glyph between the first and second intersection coordinates. The method further includes causing, by the at least one processor, a display device to render an underline along the first underline outline path between the first and second offset coordinates in the underline region of the text. In some cases, the method includes causing, by the at least one processor, the display device to render the outline path of the glyph. In some cases, the first bounds of the underline region is an upper bounds of the underline region, and the second bounds of the underline region is a lower bounds of the underline region. In some cases, the first and second bounds of the underline region are both an upper bounds of the underline region or a lower bounds of the underline region. In some cases, the offset is a coordinate offset along a horizontal axis of the underline region. In some cases, the offset is a coordinate offset along a vertical axis of the underline region. In some cases, the method includes identifying, by the at least one processor, third and fourth intersection coordinates where third and fourth bounds of the underline region of the text intersect with an offset outline path of the glyph in the text, the offset outline path of the glyph representing a distance between the outline path of the glyph and the underline region; copying, by the at least one processor, a portion of an offset outline path of the glyph between the third and fourth intersection coordinates; constructing, by the at least one processor, a second underline outline path in the underline region, the second underline outline path including the copied portion of the offset outline path of the glyph between the third and fourth intersection coordinates; and causing, by the at least one processor, the display device to render an underline along the second underline outline path between the third and fourth intersection coordinates in the underline region of the text. In some such cases, the first, third and fourth bounds of the underline region are an upper bounds of the underline region, and the second bounds of the underline region is a lower bounds of the underline region. In some other such cases, the first and third bounds of the underline region are an upper bounds of the underline region, and the second and fourth bounds of the underline region are a lower bounds of the underline region. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method for underlining text in digital typography, the method comprising:
   identifying, by at least one processor, first and second intersection coordinates where first and second bounds of an underline region of the text intersect with an outline path of a glyph in the text;
   copying, by the at least one processor, a portion of the outline path of the glyph between the first and second intersection coordinates;
   determining, by the at least one processor, first and second offset coordinates by adding or subtracting a coordinate offset along an axis of the underline region to the first and second intersection coordinates;
   constructing, by the at least one processor, a first underline outline path in the underline region, the first underline outline path including the copied portion of the outline path of the glyph between the first and second intersection coordinates; and
   causing, by the at least one processor, a display device to render an underline along the first underline outline path between the first and second offset coordinates in the underline region of the text.

2. The method of claim 1, further comprising causing, by the at least one processor, the display device to render the outline path of the glyph.

3. The method of claim 1, wherein the first bounds of the underline region is an upper bounds of the underline region, and wherein the second bounds of the underline region is a lower bounds of the underline region.

4. The method of claim 1, wherein the first and second bounds of the underline region are both an upper bounds of the underline region or a lower bounds of the underline region.

5. The method of claim 1, wherein the offset is a coordinate offset along a horizontal axis of the underline region.

6. The method of claim 1, wherein the offset is a coordinate offset along a vertical axis of the underline region.

7. The method of claim 1, further comprising:
   identifying, by the at least one processor, third and fourth intersection coordinates where third and fourth bounds of the underline region of the text intersect with an offset outline path of the glyph in the text, the offset outline path of the glyph representing a distance between the outline path of the glyph and the underline region;
   copying, by the at least one processor, a portion of an offset outline path of the glyph between the third and fourth intersection coordinates;
   constructing, by the at least one processor, a second underline outline path in the underline region, the second underline outline path including the copied portion of the offset outline path of the glyph between the third and fourth intersection coordinates; and
   causing, by the at least one processor, the display device to render an underline along the second underline outline path between the third and fourth intersection coordinates in the underline region of the text.

8. The method of claim 7, wherein:
   the first, third and fourth bounds of the underline region are an upper bounds of the underline region, and
   the second bounds of the underline region is a lower bounds of the underline region.

9. The method of claim 7, wherein:
   the first and third bounds of the underline region are an upper bounds of the underline region, and
   the second and fourth bounds of the underline region are a lower bounds of the underline region.

10. A non-transitory computer readable medium having instructions encoded thereon that when executed by at least one processor of a computing device cause the at least one processor to perform a process of underlining text in digital typography, the process comprising:
    identifying first and second intersection coordinates where first and second bounds of an underline region of the text intersect with an outline path of a glyph in the text;
    copying a portion of the outline path of the glyph between the first and second intersection coordinates;
    determining first and second offset coordinates by adding or subtracting a coordinate offset along an axis of the underline region to the first and second intersection coordinates;
    constructing a first underline outline path in the underline region, the first underline outline path including the copied portion of the outline path of the glyph between the first and second intersection coordinates; and
    causing a display device to render an underline along the first underline outline path between the first and second offset coordinates in the underline region of the text.

11. The non-transitory computer readable medium of claim 10, the process further comprising causing the display device to render the outline path of the glyph.

12. The non-transitory computer readable medium of claim 10, wherein the first bounds of the underline region is an upper bounds of the underline region, and wherein the second bounds of the underline region is a lower bounds of the underline region.

13. The non-transitory computer readable medium of claim 10, wherein the first and second bounds of the underline region are both an upper bounds of the underline region or a lower bounds of the underline region.

14. The non-transitory computer readable medium of claim 10, further comprising:
- identifying third and fourth intersection coordinates where third and fourth bounds of the underline region of the text intersect with an offset outline path of the glyph in the text, the offset outline path of the glyph representing a distance between the outline path of the glyph and the underline region;
- copying a portion of the outline path of an offset glyph between the third and fourth intersection coordinates;
- constructing a second underline outline path in the underline region, the second underline outline path including the copied portion of the offset outline path of the glyph between the third and fourth intersection coordinates; and
- causing the display device to render an underline along the second underline outline path between the third and fourth intersection coordinates in the underline region of the text.

15. A system for underlining text in digital typography, the system comprising:
- a storage; and
- at least one processor operatively coupled to the storage, the at least one processor configured to execute instructions stored in the storage that when executed cause the processor to carry out a process including
- identifying first and second intersection coordinates where first and second bounds of an underline region of the text intersect with an outline path of a glyph in the text;
- copying a portion of the outline path of the glyph between the first and second intersection coordinates;
- determining first and second offset coordinates by adding or subtracting a coordinate offset along an axis of the underline region to the first and second intersection coordinates;
- constructing a first underline outline path in the underline region, the first underline outline path including the copied portion of the outline path of the glyph between the first and second intersection coordinates; and
- causing a display device to render an underline along the first underline outline path between the first and second offset coordinates in the underline region of the text.

16. The system of claim 15, the process further comprising causing the display device to render the outline path of the glyph.

17. The system of claim 15, wherein the first bounds of the underline region is an upper bounds of the underline region, and wherein the second bounds of the underline region is a lower bounds of the underline region.

18. The system of claim 15, wherein the first and second bounds of the underline region are both an upper bounds of the underline region or a lower bounds of the underline region.

19. The system of claim 15, the process further comprising:
- identifying, by at least one processor, third and fourth intersection coordinates where third and fourth bounds of the underline region of the text intersect with an offset outline path of the glyph in the text, the offset outline path of the glyph representing a distance between the outline path of the glyph and the underline region;
- copying, by the at least one processor, a portion of an offset outline path of the glyph between the third and fourth intersection coordinates;
- constructing, by the at least one processor, a second underline outline path in the underline region, the second underline outline path including the copied portion of the offset outline path of the glyph between the third and fourth intersection coordinates; and
- causing, by the at least one processor, a display device to render an underline along the second underline outline path between the third and fourth intersection coordinates in the underline region of the text.

20. The system of claim 19, wherein:
the first, third and fourth bounds of the underline region are an upper bounds of the underline region, and
the second bounds of the underline region is a lower bounds of the underline region.

* * * * *